United States Patent
Liu et al.

(10) Patent No.: US 11,928,824 B2
(45) Date of Patent: Mar. 12, 2024

(54) THREE-DIMENSIONAL SEGMENTATION ANNOTATION

(71) Applicant: International Business Machines Corporation, Armonk, NY (US)

(72) Inventors: Xue Ping Liu, Beijing (CN); Dan Zhang, Beijing (CN); Yuan Yuan Ding, Shanghai (CN); Chao Xin, Ningbo (CN); Fan Li, Xianyang (CN); Hong Bing Zhang, BeiJIng (CN); Xu Min, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 17/472,849

(22) Filed: Sep. 13, 2021

(65) Prior Publication Data

US 2023/0078574 A1 Mar. 16, 2023

(51) Int. Cl.
*G06T 7/136* (2017.01)
*G06F 18/23* (2023.01)
*G06K 9/62* (2022.01)

(52) U.S. Cl.
CPC ............. *G06T 7/136* (2017.01); *G06F 18/23* (2023.01); *G06T 2200/04* (2013.01); *G06T 2207/10028* (2013.01)

(58) Field of Classification Search
CPC ................. G06T 7/136; G06T 2200/04; G06T 2207/10028; G06F 18/23
See application file for complete search history.

(56) References Cited

U.S. PATENT DOCUMENTS

| | | | | |
|---|---|---|---|---|
| 9,207,069 B2* | 12/2015 | Kitamura | ................ | G01S 17/89 |
| 9,355,449 B2* | 5/2016 | Gulaka | ................... | G06T 19/20 |
| 11,170,264 B2* | 11/2021 | Sallee | .................... | G06V 20/20 |
| 11,367,250 B2* | 6/2022 | Totty | ......................... | G06T 7/74 |
| 11,557,086 B2* | 1/2023 | Hu | ........................... | G06T 3/067 |
| 11,669,988 B1* | 6/2023 | Miller | ..................... | G06T 7/593 |
| | | | | 382/154 |
| 11,741,620 B1* | 8/2023 | Kim | ......................... | G06T 7/50 |
| 2017/0116781 A1 | 4/2017 | Babahajiani | | |
| 2023/0072966 A1* | 3/2023 | Batsos | ................. | G06V 10/809 |

FOREIGN PATENT DOCUMENTS

| | | |
|---|---|---|
| CN | 106530380 A | 3/2017 |
| CN | 110728210 A | 1/2020 |
| CN | 112598741 A | 4/2021 |

OTHER PUBLICATIONS

"Hitachi-Automotive-And-Industry-Lab / semantic-segmentation-editor," GitHub, Jul. 2018, 8 pages.
(Continued)

*Primary Examiner* — Gregory M Desire
(74) *Attorney, Agent, or Firm* — Van Leeuwen & Van Leeuwen; Edward J. Wixted

(57) ABSTRACT

An approach is provided in which the approach receives an image that includes multiple image points and constructs a plane in the image based on a first subset of the plurality of image points. The approach identifies a second subset of the image points that belong to the plane and are not part of the first subset of image points, and removes the first subset of image points and the second subset of image points form the image points. The approach annotates the remaining subset of image points in the image.

20 Claims, 6 Drawing Sheets

(56) References Cited

OTHER PUBLICATIONS

"Scalabel Human-machine collaboration platform for visual data annotation," GitHub, Jul. 2019, 2 pages.
Yuan et al., "Point Cloud Clustering and Outlier Detection Based on Spatial Neighbor Connected Region Labeling," Measurement and Control, SAGE, London, Institute of Measurement and Control, pp. 1-10, May 2020.

* cited by examiner

THREE-DIMENSIONAL SEGMENTATION ANNOTATION

BACKGROUND

In digital image processing and computer vision, image segmentation is the process of partitioning a digital image into multiple segments (sets of pixels, also known as image objects). The goal of segmentation is to simplify and/or change the representation of an image into something that is more meaningful and easier to analyze. Image segmentation is typically used to locate objects and boundaries (lines, curves, etc.) in images. More precisely, image segmentation is the process of assigning a label to every pixel in an image such that pixels with the same label share certain characteristics. Semantic segmentation is an approach of detecting each pixel belonging to a class of the object. For example, people may be semantically segmented into one object and the background may be semantically segmented into a different object.

A point cloud is a set of data points in space, also referred to herein as image points. The points may represent a 3D shape or object and have a corresponding set of Cartesian coordinates (x, y, z). Point clouds are generally produced by 3D scanners or by photogrammetry software, which measure many points on the external surfaces of objects around them. As the output of 3D scanning processes, point clouds are used for many purposes, such as creating 3D CAD (Computer-Aided Design) models for manufactured parts, for metrology and quality inspection, and for a multitude of visualization, animation, rendering and mass customization applications. While point clouds can be directly rendered and inspected, point clouds are often converted to polygon mesh or triangle mesh models, NURBS (Non-Uniform Rational B-Splines) surface models, or CAD models through a process referred to as surface reconstruction.

BRIEF SUMMARY

According to one embodiment of the present disclosure, an approach is provided in which receives an image that includes multiple image points and constructs a plane in the image based on a first subset of the plurality of image points. The approach identifies a second subset of the image points that belong to the plane and are not part of the first subset of image points, and removes the first subset of image points and the second subset of image points form the image points. The approach annotates the remaining subset of image points in the image.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
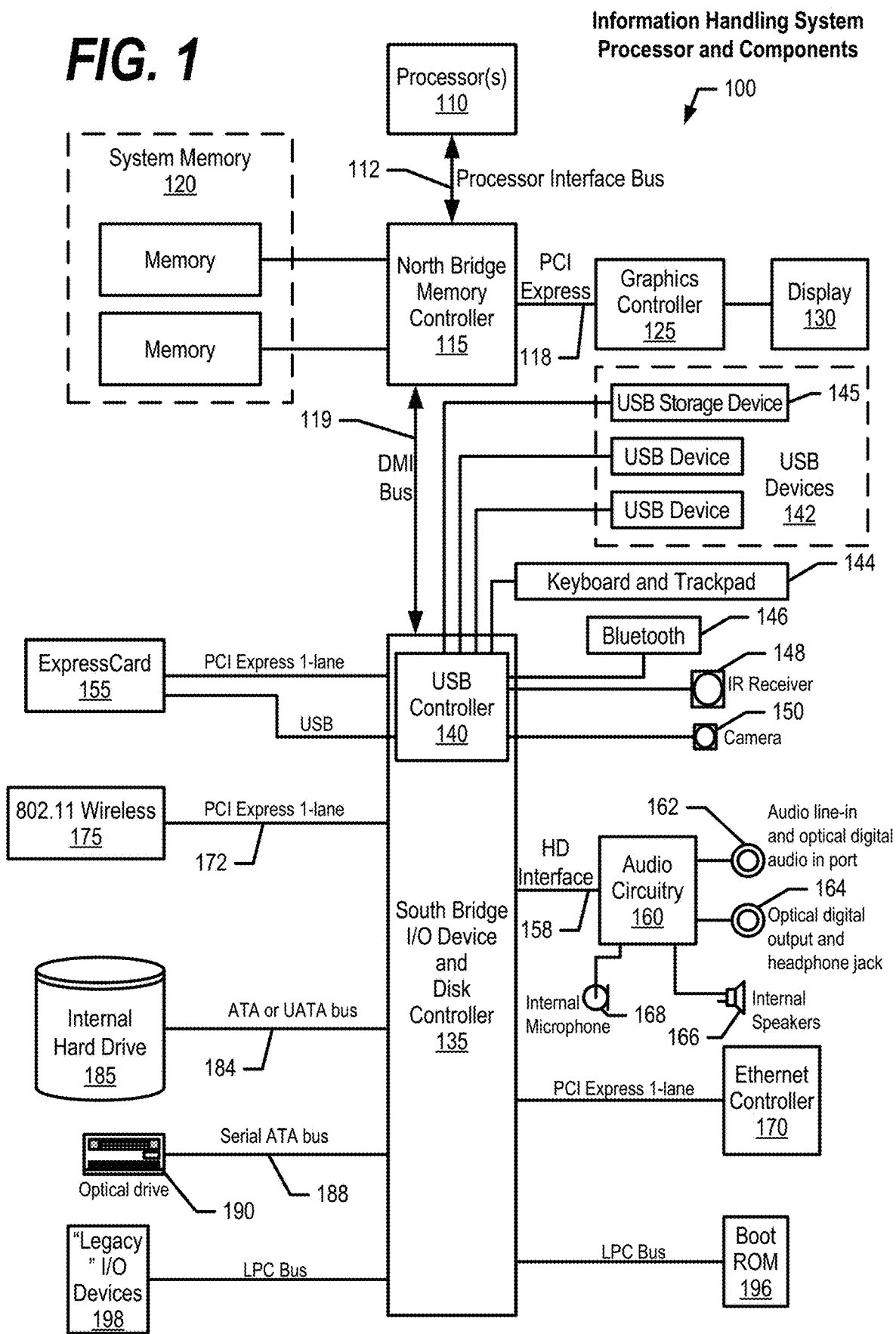
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
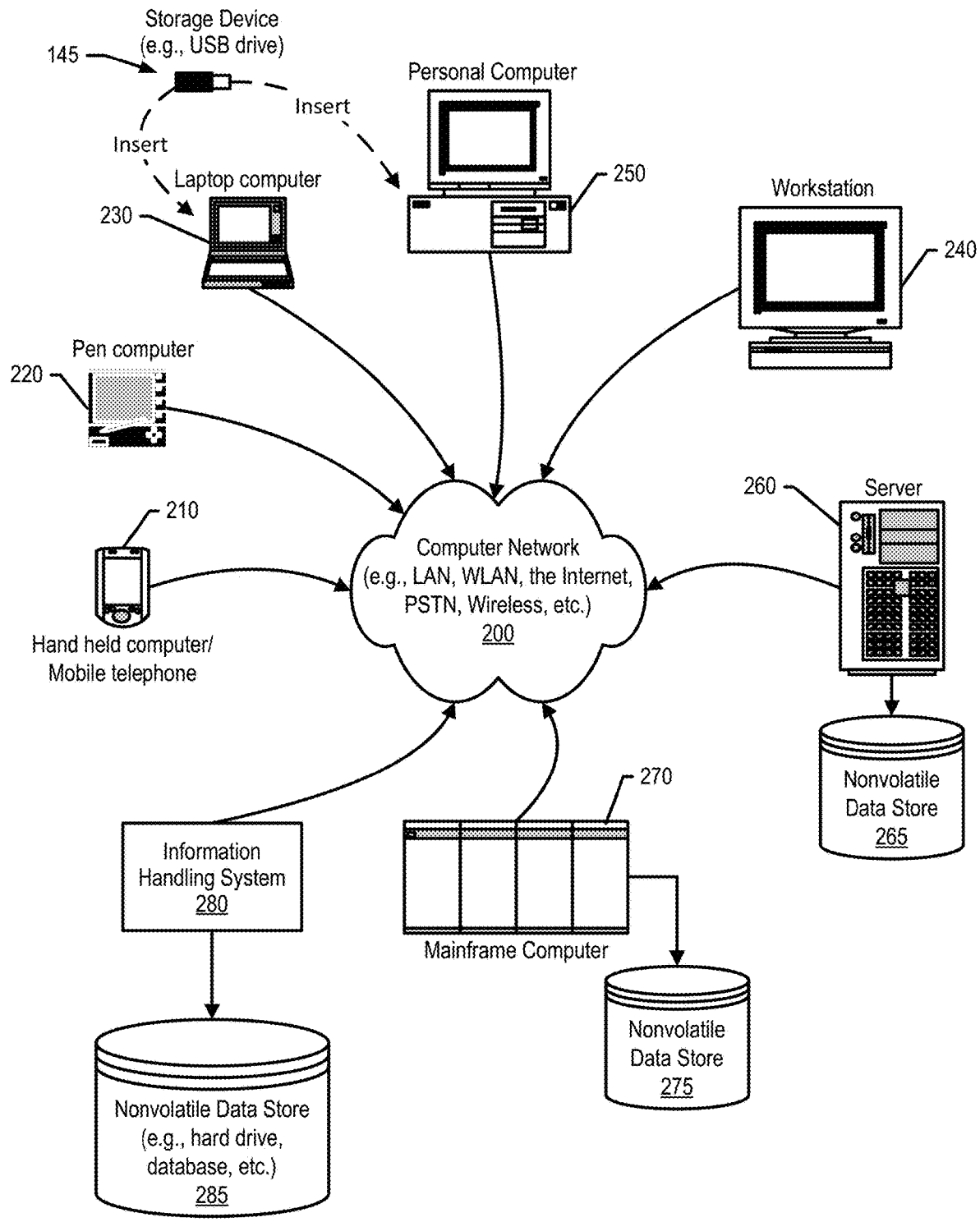
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, sematic segmentation detects pixels belong to a same class of object (person, background, etc.). A challenge found with today's systems is that annotating a 3D segmentation dataset is very time-consuming. Today's systems typically require multiple adjustments and iterations to obtain accurate object outlines. In addition, grounds, floors, and walls are very common in indoor or outdoor 3D models, which are usually not target objects of interest. Most target objects, however, are connected to these background planes and separating target objects from the background planes is difficult. In addition, today's systems have difficulty in using algorithms to directly find the target object from the background planes.

FIGS. 3 through 6 depict an approach that can be executed on an information handling system that filters background planes from images and improves annotation labeling efficiency. In one embodiment, the approach marks at least three point cloud clusters in different corners of a ground or wall and generates a plane equation. The approach then uses the plane equation and a clustering algorithm to identify image points belonging to the plane, remove the identified image points, and recommend candidate targets based on the remaining image points.

Figure 3:
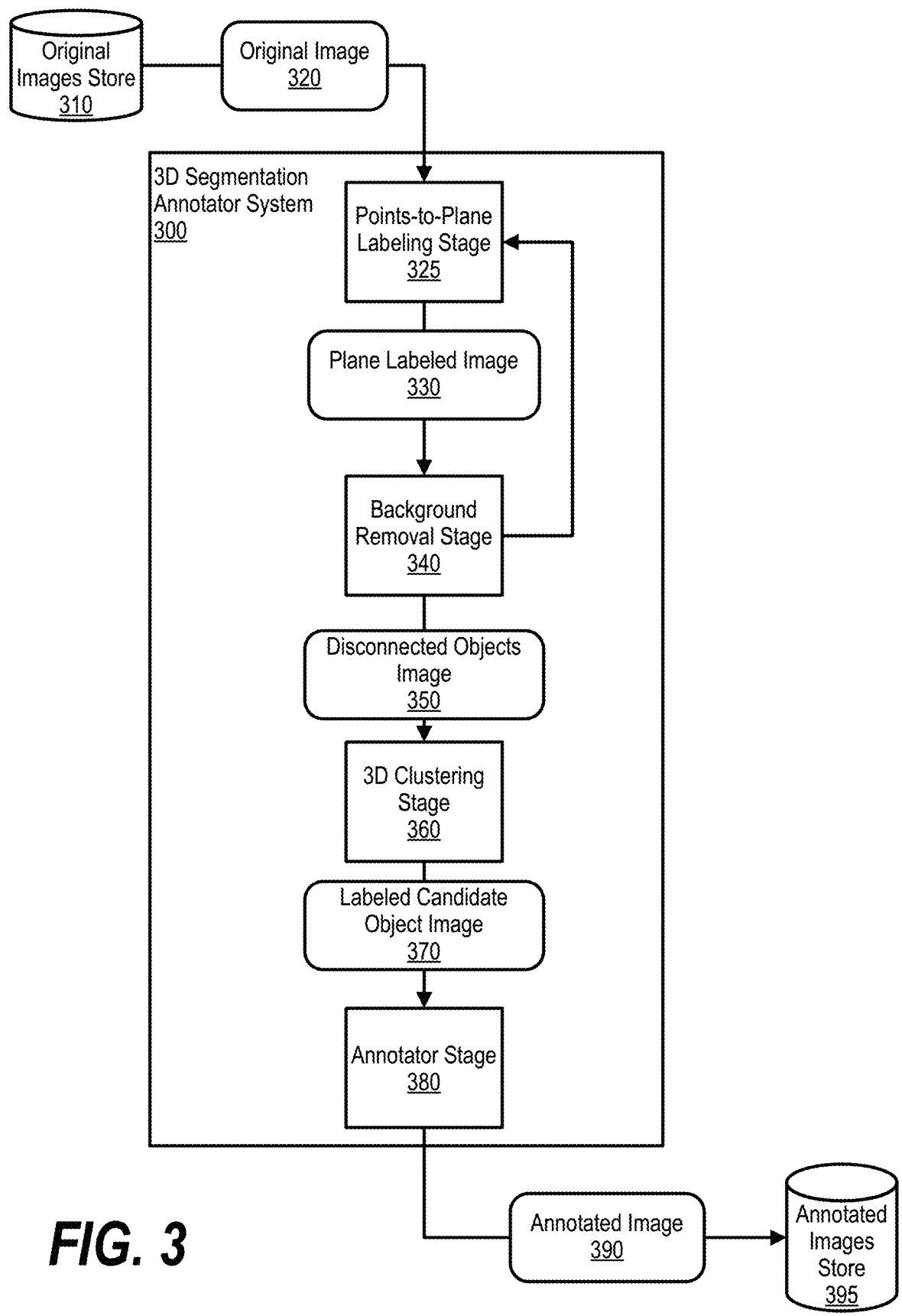
FIG. 3 is an exemplary diagram depicting a 3D segmentation annotator system removing background planes from a point cloud image and annotating target objects.

FIG. 3 is an exemplary diagram depicting a 3D segmentation annotator system removing background planes from a point cloud image and annotating target objects. 3D segmentation annotator system 300 retrieves original image 320 from original image store 310. Original image 320, in one embodiment, is a 3-dimensional point cloud.

Points to plane labeling stage 325 identifies image points (also referred to herein as "points") belong to a background plane and labels the points accordingly. In one embodiment, points-to-plane labeling stage 325 labels several small background regions on a particular plane, and then fits a plane equation with the labeled points using various algorithms such as a least square method, RANdom SAmple Consensus (RANSASC), etc. Points-to-plane labeling stage 325 then performs steps to identify points and neighboring points that belong to the plane and generates plane labeled image 330.

Background plane removal stage 340 receives plane labeled image 330 and removes the labeled points, which effectively disconnects the remaining objects from each other. In one embodiment, 3D segmentation annotator system 300 performs multiple iterations using points-to plane labeling stage 325 and background removal stage 340 to remove multiple background planes. For example, 3D segmentation annotator system 300 may remove points corresponding to a floor on a first iteration, and remove points corresponding to a wall on the second iteration. When the points corresponding to each of the background planes are removed, background removal stage 340 sends disconnected objects image 350 to 3D clustering stage 360.

3D clustering stage 360 performs a 3D point clustering algorithm on the remaining points and provides label candidates. In one embodiment, the process analyzes colors and textures to effectively cluster the points into label candidates. 3D clustering stage 360 then sends labeled candidate object image 370 to annotator stage 380. Annotator stage 380 annotates the remaining objects and stores annotated image in annotated images store 395.

Figure 4:
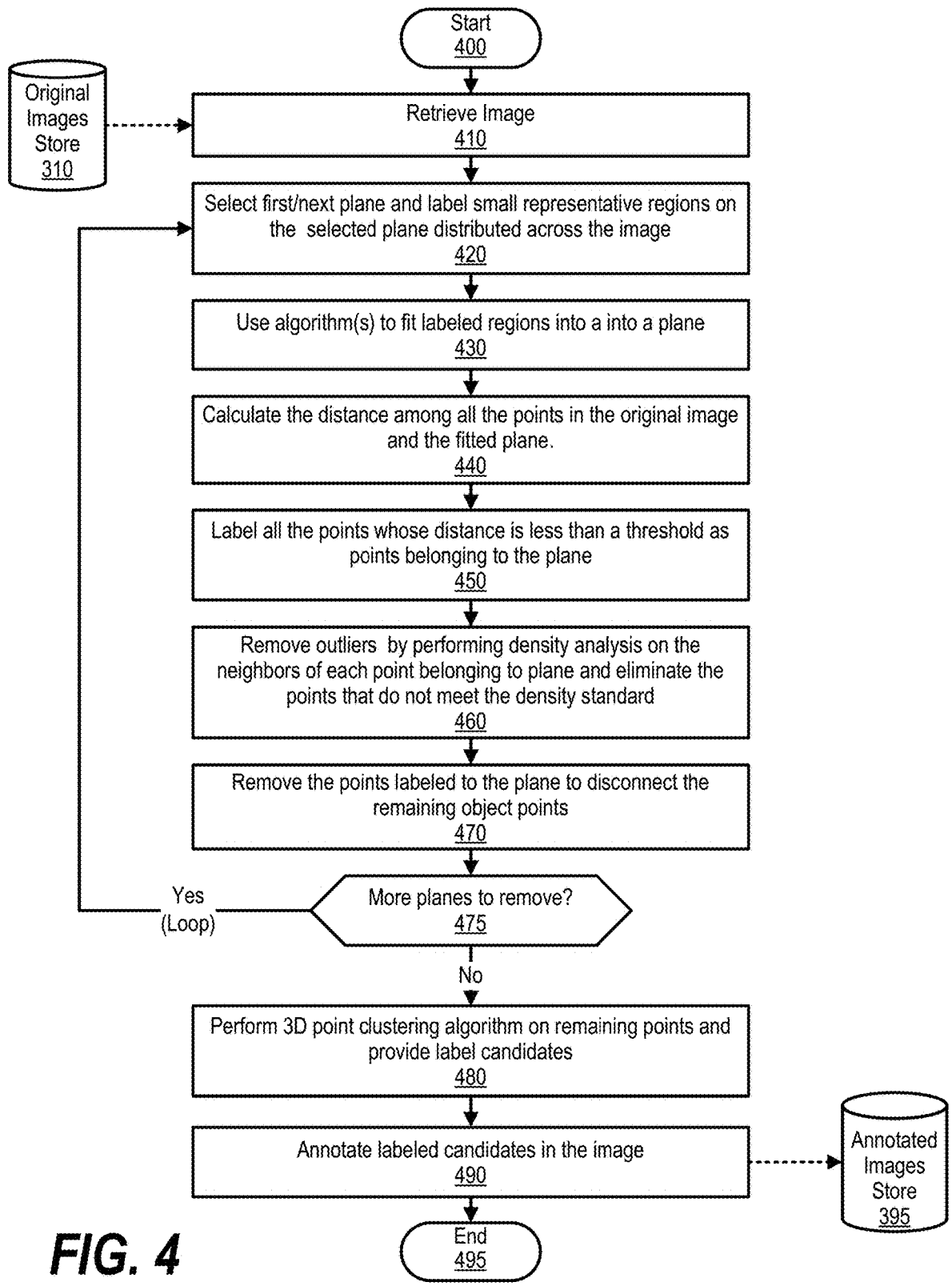
FIG. 4 is an exemplary flowchart showing steps taken to remove background planes from images and annotate target images.

FIG. 4 is an exemplary flowchart showing steps taken to remove background planes from images and annotate target images. FIG. 4 processing commences at 400 whereupon, at step 410, the process retrieves original image 320 from original images store 310. At step 420, the process selects the first plane (e.g., floor, wall, etc.) and labels several small background regions (first subset of image points) on the selected plane distributed across the image.

At step 430, the process uses algorithms (e.g., least square method, RANdom SAmple Consensus (RANSASC), etc.) to fit the labeled regions into a plane where each of the regions belong to a same plane (second subset of image points). In one embodiment, by inputting point cloud data on the same plane, the process generates plane equations corresponding to the point cloud such as:

$$ax+by+cz=0 \quad \text{Plane Equation:}$$

Then, at step 440, the process calculates the distance among all the points in the original image and the fitted plane. At step 450, the process labels the image points whose distance from the plane is less than a predetermined threshold. For example, when a=2, b=5, c=−13, and the threshold is e=0.5, a point with Cartesian coordinates of (1.6, 2, 1) results in 1.6*2+2*5+1*(−13)=0.2. In this example, 0.2<e and therefore the point (1.6, 2, 1) is considered on the plane.

At step 460, the process removes outliers from the plane by performing density analysis on the neighbors of each point belonging to the plane and eliminates those points that do not meet a density threshold. In one embodiment, the density threshold in step 460 is a hyper parameter and depends on the density of point cloud data (differs with source devices) and target object. At step 470, the process removes the points labeled to the selected plane that, in turn, disconnects the remaining object points.

The process determines as to whether there are more image points in other planes to remove in the image (decision 475). For example, the process may remove a floor in a first iteration, and need to remove a wall in a second iteration. If there are more planes to remove in the image, decision 475 branches to the 'yes' branch, which loops back to select and remove points from the newly selected plane. This process continues until there are no more planes to remove from the image, at which point decision 475 branches to the 'no' branch exiting the loop.

At step 480, the process performs a 3D point clustering algorithm on the remaining points and provides label candidates. In one embodiment, the process analyzes colors and textures to effectively cluster the points into label candidates. At step 490, the process annotates the image using the label candidates and stores annotated image 390 in annotated images store 395. In one embodiment, after performing the 3D point clustering algorithm, the process divides the remaining points into several classes, such as "house," "tree," "person," etc. In this embodiment, the process defines labels for the classes and annotates the points accordingly. FIG. 4 processing thereafter ends at 495.

Figure 5:
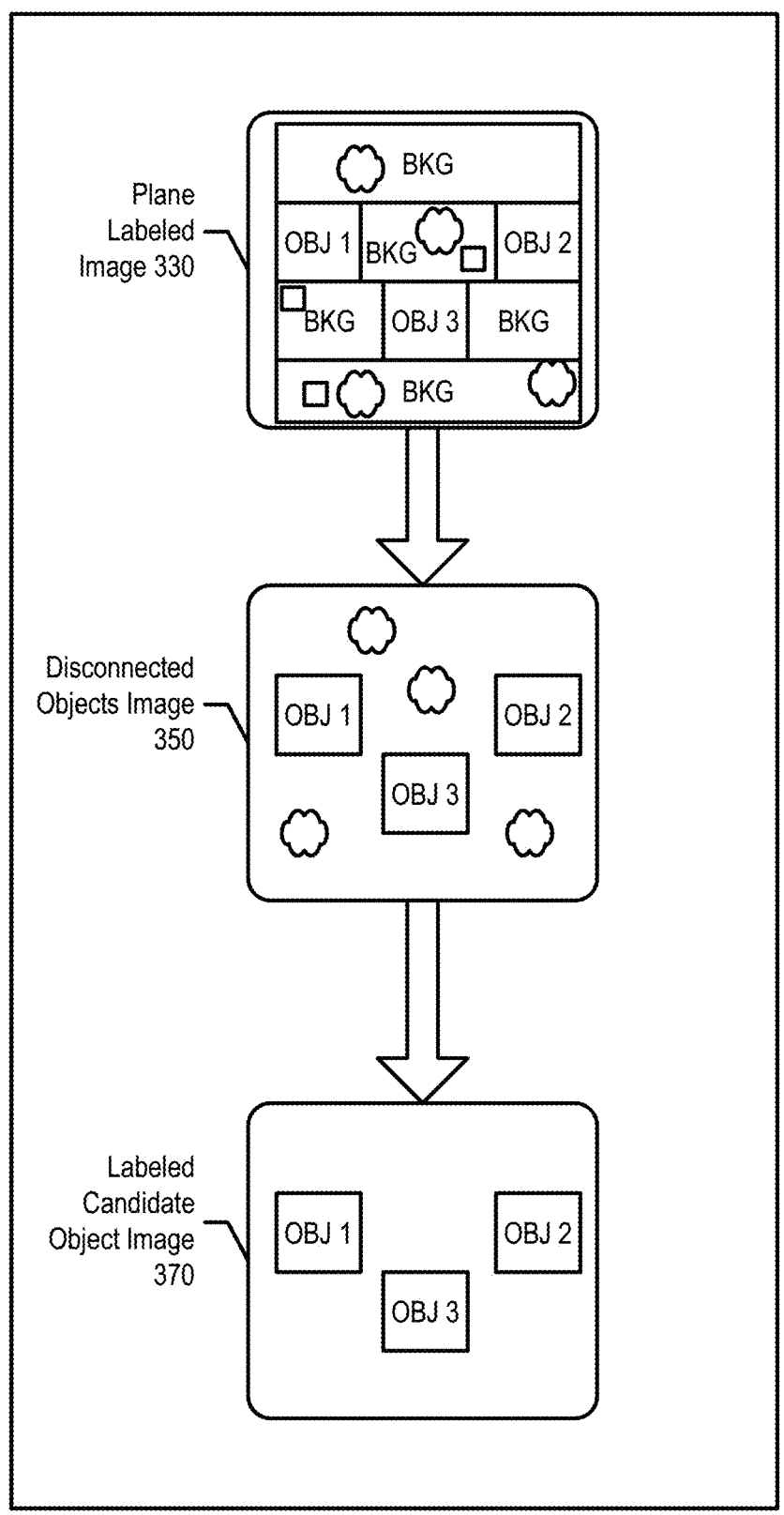
FIG. 5 is an exemplary diagram depicting 3D segmentation annotator system 300 removing a background plane from an outdoor image.

FIG. 5 is an exemplary diagram depicting 3D segmentation annotator system 300 removing a background plane from an outdoor image. Plane labeled image 330 is an outdoor image, such as a satellite image of a neighborhood. Plane labeled image 330 includes various objects and a background plane, which has been labeled via points-to-plane labeling stage 325.

When plane labeled image 330 feeds into background removal stage 340, background removal stage 340 removes all of the points corresponding to the background plane, which results in disconnected objects image 350. Disconnected objects image 350 includes various objects, some of which may be target objects.

Disconnected objects image 358 feeds into 3D clustering stage 360, which clusters the objects into groups and labels them accordingly. FIG. 5 shows that labeled candidate object image 370 includes a group of objects 1, 2, and 3, which correspond to the same object type (e.g., rooftops). In turn, as discussed herein, annotator stage 380 efficiently annotates the remaining target objects in labeled candidate object image 370.

Figure 6:
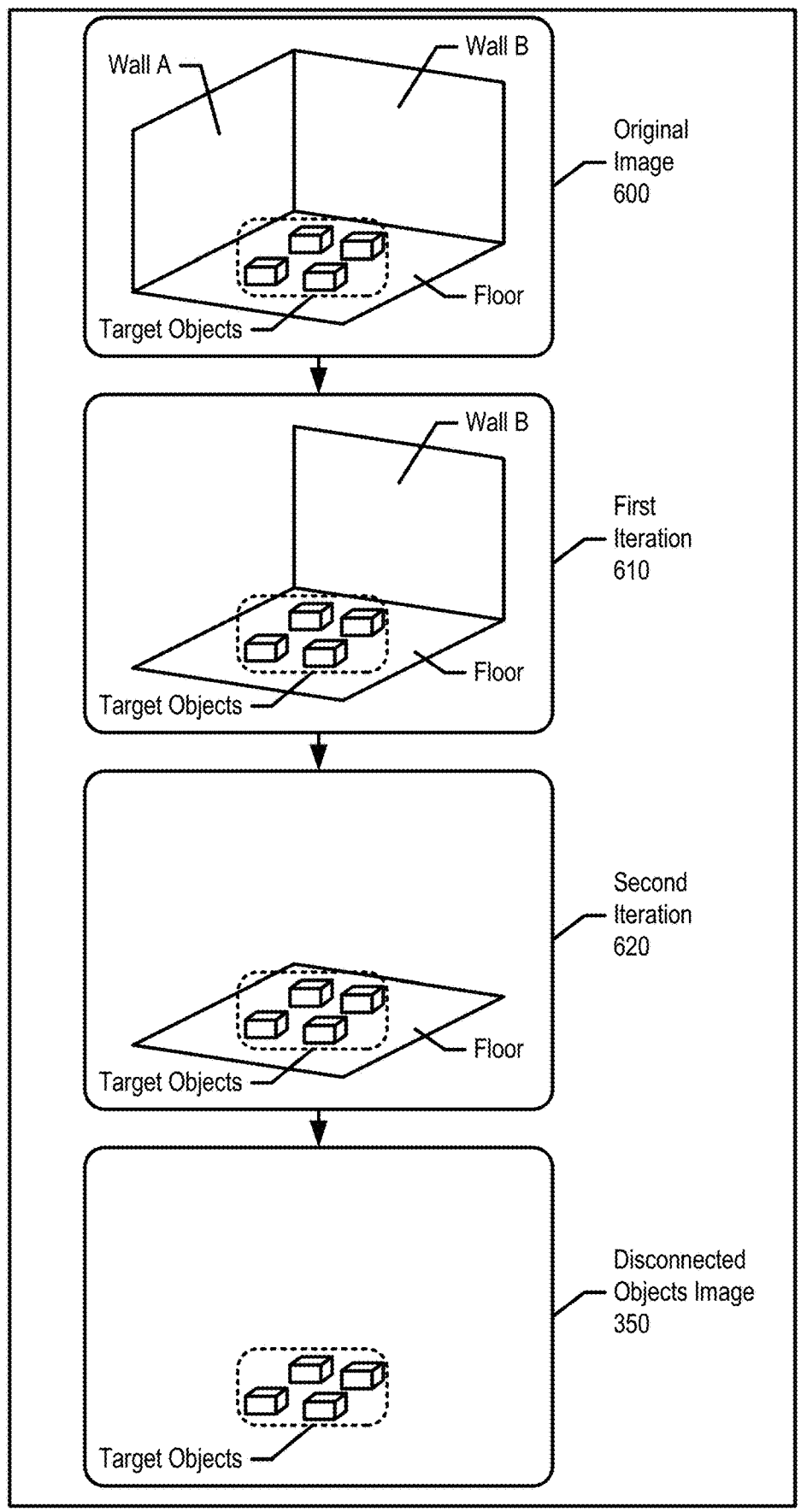
FIG. 6 is an exemplary diagram depicting 3D segmentation annotator system 300 iteratively removing background planes from an indoor image.

FIG. 6 is an exemplary diagram depicting 3D segmentation annotator system 300 iteratively removing background planes from an indoor image. Original image 600 is an image of an indoor area, such as an office room. Original image 600 includes target objects, a floor, and two walls A and B.

When original image 600 feeds into points-to-plane labeling stage 325, 3D segmentation annotator system 300 selects and removes one of the background planes via background removal stage 340. First iteration 610 shows that 3D segmentation annotator system 300 removes wall A in the first background plane removal iteration.

Then, 3D segmentation annotator system 300 feeds first iteration 610 back into points-to-plane labeling stage 325, and a second background plane is removed via background removal stage 340. Second iteration 620 shows that 3D segmentation annotator system 300 removes wall B in the second background plane removal iteration.

3D segmentation annotator system 300 feeds second iteration 620 back into points-to-plane labeling stage 325 and removes the final background plane (floor). In turn, 3D segmentation annotator system 300 produces disconnected objects image 350 that includes target objects without background planes. In turn, 3D segmentation annotator system 300 clustering stage 360 clusters the target objects and annotator stage 380 efficiently annotates the target objects as discussed herein.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A computer-implemented method comprising:
receiving an image comprising a plurality of image points;
constructing a first plane in the image based on a first subset of the plurality of image points that belong to the first plane;
identifying a second subset of the plurality of image points that belong to the first plane and are not part of the first subset of image points;
removing the first subset of image points and the second subset of image points from the plurality of image points, wherein removing produces a remaining subset of the plurality of image points in the image; and
annotating the remaining subset of image points.

2. The computer-implemented method of claim 1 wherein the first subset of image points only comprises a first image point, a second image point, and a third image point.

3. The computer-implemented method of claim 1 further comprising:
calculating a plurality of distances between the first plane and the second subset of image points; and
adding the second subset of image points to the first plane in response to determining that their corresponding distances to the first plane are below a threshold.

4. The computer-implemented method of claim 1 further comprising:
performing a density analysis on the second subset of image points; and
removing one or more of the subset of image points from the first plane based on the density analysis and a density threshold.

5. The computer-implemented method of claim 1 further comprising:
constructing a second plane in the image based on a third subset of image points belonging to the second plane and included in the remaining subset of image points;
identifying a fourth subset of image points from the remaining subset of image points that belong to the second plane and are not part of the third subset of image points;
removing the third subset of image points and the fourth subset of image points from the remaining subset of image points to produce a final remaining subset of image points; and
annotating the final remaining subset of image points.

6. The computer-implemented method of claim 5 further comprising:
performing a 3D cluster analysis on the final remaining subset of image points; and
providing a set of label candidates of the final remaining subset of image points in response to performing the 3D cluster analysis.

7. The computer-implemented method of claim 1 wherein the image is a point cloud image, and wherein the first plane corresponds to a flat surface in the point cloud image selected from the group consisting of a wall, a floor, and a ground.

8. An information handling system comprising:
one or more processors;
a memory coupled to at least one of the processors;
a set of computer program instructions stored in the memory and executed by at least one of the processors in order to perform actions of:
receiving an image comprising a plurality of image points;
constructing a first plane in the image based on a first subset of the plurality of image points that belong to the first plane;
identifying a second subset of the plurality of image points that belong to the first plane and are not part of the first subset of image points;
removing the first subset of image points and the second subset of image points from the plurality of image points, wherein removing produces a remaining subset of the plurality of image points in the image; and
annotating the remaining subset of image points.

9. The information handling system of claim 8 wherein the first subset of image points only comprises a first image point, a second image point, and a third image point.

10. The information handling system of claim 8 wherein the processors perform additional actions comprising:
calculating a plurality of distances between the first plane and the second subset of image points; and
adding the second subset of image points to the first plane in response to determining that their corresponding distances to the first plane are below a threshold.

11. The information handling system of claim 8 wherein the processors perform additional actions comprising:
performing a density analysis on the second subset of image points; and
removing one or more of the subset of image points from the first plane based on the density analysis and a density threshold.

12. The information handling system of claim 8 wherein the processors perform additional actions comprising:
- constructing a second plane in the image based on a third subset of image points belonging to the second plane and included in the remaining subset of image points;
- identifying a fourth subset of image points from the remaining subset of image points that belong to the second plane and are not part of the third subset of image points;
- removing the third subset of image points and the fourth subset of image points from the remaining subset of image points to produce a final remaining subset of image points; and
- annotating the final remaining subset of image points.

13. The information handling system of claim 12 wherein the processors perform additional actions comprising:
- performing a 3D cluster analysis on the final remaining subset of image points; and
- providing a set of label candidates of the final remaining subset of image points in response to performing the 3D cluster analysis.

14. The information handling system of claim 8 wherein the image is a point cloud image, and wherein the first plane corresponds to a flat surface in the point cloud image selected from the group consisting of a wall, a floor, and a ground.

15. A computer program product stored in a computer readable storage medium, comprising computer program code that, when executed by an information handling system, causes the information handling system to perform actions comprising:
- receiving an image comprising a plurality of image points;
- constructing a first plane in the image based on a first subset of the plurality of image points that belong to the first plane;
- identifying a second subset of the plurality of image points that belong to the first plane and are not part of the first subset of image points;
- removing the first subset of image points and the second subset of image points from the plurality of image points, wherein removing produces a remaining subset of the plurality of image points in the image; and
- annotating the remaining subset of image points.

16. The computer program product of claim 15 wherein the first subset of image points only comprises a first image point, a second image point, and a third image point.

17. The computer program product of claim 15 wherein the information handling system performs further actions comprising:
- calculating a plurality of distances between the first plane and the second subset of image points; and
- adding the second subset of image points to the first plane in response to determining that their corresponding distances to the first plane are below a threshold.

18. The computer program product of claim 15 wherein the information handling system performs further actions comprising:
- performing a density analysis on the second subset of image points; and
- removing one or more of the subset of image points from the first plane based on the density analysis and a density threshold.

19. The computer program product of claim 15 wherein the information handling system performs further actions comprising:
- constructing a second plane in the image based on a third subset of image points belonging to the second plane and included in the remaining subset of image points;
- identifying a fourth subset of image points from the remaining subset of image points that belong to the second plane and are not part of the third subset of image points;
- removing the third subset of image points and the fourth subset of image points from the remaining subset of image points to produce a final remaining subset of image points; and
- annotating the final remaining subset of image points.

20. The computer program product of claim 19 wherein the information handling system performs further actions comprising:
- performing a 3D cluster analysis on the final remaining subset of image points; and
- providing a set of label candidates of the final remaining subset of image points in response to performing the 3D cluster analysis.

* * * * *